(12) United States Patent
Canada et al.

(10) Patent No.: US 7,106,110 B2
(45) Date of Patent: Sep. 12, 2006

(54) CLOCK DITHERING SYSTEM AND METHOD DURING FREQUENCY SCALING

(75) Inventors: Miles G. Canada, Colchester, VT (US); Erwin B. Cohen, South Burlington, VT (US); Jay G. Heaslip, Williston, VT (US); Cedric Lichtenau, Boeblingen (DE); Thomas Pflueger, Leinfelden (DE); Mathew I. Ringler, Burlington, VT (US)

(73) Assignee: International Business Machines Corporation, Armonk, NY (US)

( * ) Notice: Subject to any disclaimer, the term of this patent is extended or adjusted under 35 U.S.C. 154(b) by 173 days.

(21) Appl. No.: 10/710,681

(22) Filed: Jul. 28, 2004

(65) Prior Publication Data

US 2006/0022723 A1 Feb. 2, 2006

(51) Int. Cl.
*H03B 19/00* (2006.01)
(52) U.S. Cl. .................................. 327/114; 327/175
(58) Field of Classification Search ............. None
See application file for complete search history.

(56) References Cited

U.S. PATENT DOCUMENTS

| 4,200,842 | A | * | 4/1980 | Monnier | 377/110 |
| 4,366,349 | A | * | 12/1982 | Adelman | 381/316 |
| 6,404,260 | B1 | | 6/2002 | Cruz-Albrecht | 327/299 |
| 6,914,463 | B1 | * | 7/2005 | Henry | 327/150 |

OTHER PUBLICATIONS

*Frequency Modulation of System Clocks for EMI Reduction*, Cornelis D. Hoekstra, Hewlett-Packard Journal, Aug. 1997, Article 13, pp. 1-7.

* cited by examiner

*Primary Examiner*—Timothy P. Callahan
*Assistant Examiner*—Cassandra Cox
(74) *Attorney, Agent, or Firm*—Downs Rachlin Martin PLLC

(57) ABSTRACT

A system and method of shifting a clock frequency of an integrated circuit device from a first frequency to a second frequency, including alternating between the first frequency and the second frequency according to a dithering pattern, the alternating occurring for a predetermined number of cycles; and setting the clock frequency to the second frequency after the predetermined number of cycles.

20 Claims, 3 Drawing Sheets

CLOCK DITHERING SYSTEM AND METHOD DURING FREQUENCY SCALING

BACKGROUND OF INVENTION

1. Field of the Invention

The present invention generally relates to the field of integrated circuits. In particular, the present invention is directed to a clock dithering system and method during frequency scaling.

2. Background of the Invention

As micro-electronic devices become smaller and smaller, power consumption has become a critical concern for microelectronic designers. In order to provide for low power consumption in microprocessors, designers have provided for dual frequency systems in which the clock of the system is set at a low frequency when the amount of information to be processed is small and set at a high frequency when the amount of information to be processed is large. The low frequency setting allows for lower power consumption during low usage states. However, changing the frequency back and forth between low frequency states and high frequency states creates a significant amount of power noise in the system due to the sudden changes in current requirements. These power fluctuations on the processor itself create noticeable performance problems.

Prior attempts to reduce this noise generation include turning off portions of the processor or stopping clocks while changing the frequency. However, this solution also halts any information handling during the frequency change. Another method of changing the frequency includes gradually changing the frequency input into a phase locked loop (PLL) circuit. Due to the characteristics of most PLL's, changing the frequency using this method takes a significant amount of time to complete and the range of frequency change is greatly limited by the boundaries of the PLL.

Clock dithering has been used to constantly modulate a frequency signal for the purpose of reducing electromagnetic interference (EMI) emitted from electronic devices. Such EMI may interfere with other electronic devices in the vicinity. For example, U.S. Pat. No. 6,404,260 to Cruz-Albrecht describes the use of a non-periodic signal to modulate the period of a clock signal in order to reduce the size of spikes of electromagnetic radiation generated by a circuit that uses the clock signal. In another example, clock frequency modulation is described as a method of reducing EMI (See "Frequency Modulation of System Clocks for EMI Reduction," by Cornelis D. Hoekstra, Hewlett-Packard Journal, August 1997). However, the clock dithering in these applications has been a constant modulation of the clock frequency to reduce interference with other devices and does not address the in-system noise generated during the change of a clock from a first frequency to a second frequency.

Accordingly, there is a need for a system and a method of changing the frequency of an integrated circuit device from one frequency to another quickly while reducing on-system noise and having the ability to process information during the frequency change.

SUMMARY OF INVENTION

The present disclosure provides a method of shifting a clock frequency of an integrated circuit device from a first frequency to a second frequency. The method includes alternating between the first frequency and the second frequency according to a dithering pattern, the alternating occurring for a predetermined number of cycles; and setting the clock frequency to the second frequency after the predetermined number of cycles.

The present disclosure further provides a method of shifting a clock frequency of an integrated circuit device from a first frequency to a second frequency, the method including providing a clock multiplexer operatively configured to select between a plurality of incoming clock frequencies, wherein the first frequency and second frequency are amongst the plurality of incoming clock frequencies; providing the dithering pattern to the clock multiplexer; alternating the clock frequency of the integrated circuit between the first frequency and the second frequency according to the dithering pattern for a predetermined number of clock cycles; and setting the clock frequency of the integrated circuit at the second frequency after the predetermined number of clock cycles.

The present disclosure still further provides a system for shifting a clock frequency of an integrated circuit device from a first frequency to a second frequency. In one embodiment, the system includes a frequency selecting element operatively configured to switch between a first input frequency signal and a second input frequency signal, wherein the frequency selecting element provides an output frequency signal; and a dithering pattern control element operatively configured to produce a dithering pattern, the dithering pattern controlling the frequency selecting element so as to cause said frequency selecting element to alternate between the first and second input frequency signals for a predetermined number of cycles. The output frequency signal is set at the second frequency signal after the predetermined number of cycles.

BRIEF DESCRIPTION OF DRAWINGS

For the purpose of illustrating the invention, the drawings show a form of the invention that is presently preferred. However, it should be understood that the present invention is not limited to the precise arrangements and instrumentalities shown in the drawings, wherein.

DETAILED DESCRIPTION

Figure 1:
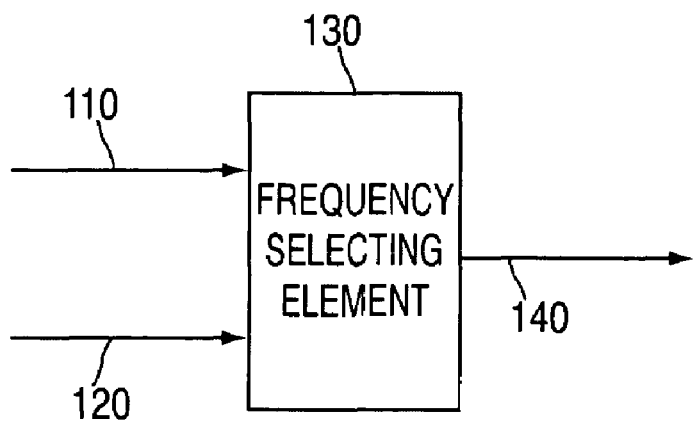
FIG. 1 shows a system and a method for changing the frequency of an integrated circuit according to the present disclosure.

Referring now to the drawings, FIG. 1 illustrates with the current disclosure a system and a method for changing the frequency of an integrated circuit from a first frequency to a second frequency. First frequency signal 110 and a second frequency signal 120 are provided to frequency selecting element 130. One of signals 110 and 120 has a higher frequency than the other. Frequency selecting element 130 is operatively configured to switch between first frequency signal 110 and second frequency signal 120. At the start of changing the frequency, output frequency signal 140 is that of first frequency signal 110. During the change, frequency selecting element 130 dithers second frequency signal 120 into output frequency signal 140 such that over a predetermined number of clock cycles second frequency signal 120 gradually replaces first frequency signal 110 as output frequency signal 140. After the predetermined number of clock cycles, output frequency signal 140 is set to the second frequency signal 120. It should be noted that the present disclosure contemplates that any number of frequency signals may be provided to frequency selecting element 130 and that frequency selecting element 130 can be operatively configured to select between any two of the incoming frequency signals as first frequency signal and second frequency signal.

Frequency selecting element 130 can be any circuit element or elements capable of selecting amongst a plurality of incoming frequency signals in a patterned way to gradually replace a first frequency signal with a second frequency signal over a predetermined number of clock cycles after which the second frequency signal is set as the frequency of the integrated circuit. Examples of suitable frequency selecting elements include, but are not limited to, a multiplexer or an analog mixer.

In one embodiment, the frequency selecting element selects first frequency signal 110 or second frequency signal 120 based on a cycle rate of the slower of the two frequency signals. In one example, where first frequency signal 110 is f cycles/second and second frequency signal 120 is f/2 cycles per second, the frequency selecting element selects between the two frequencies based on the cycle rate of f/2 cycles/second.

In another example, where the required change in frequency of the integrated circuit is from f/4 cycles per second to f/2 cycles/second, the frequency selecting element will select between the f/4 frequency and the f/2 frequency using the f/4 frequency. An example of a gradual replacement of f/4 with f/2 would include starting with f/4 then having f/2 for one cycle of the f/4 clock (which would actually be 2 cycles of the f/2 signal) followed by f/4 for three cycles of the f/4 clock, followed by f/2 for two cycles of the f/4 clock (which would actually be 4 cycles of the f/2 signal). The dithering of the second frequency signal into first frequency signal, in this case second frequency signal being f/2, continues for a predetermined number of cycles of the slower frequency clock, in this case f/4. In one example, the predetermined number of cycles of the slower frequency clock is 24. However, the predetermined number of cycles can be selected to any number such that the average of the output frequency signal gradually changes to the second frequency signal. Gradual changing of the output frequency signal to the second frequency signal prior to setting the output frequency signal to the second frequency signal has been unexpectedly found to allow a slower shift of current draw since the average current increases or decreases over a longer period of time than if the frequency was shifted from a first frequency signal to a second frequency signal in one cycle. Accordingly, the power noise and/or fluctuations created during the shift in the integrated circuit itself is minimized. The integrated circuit remains functioning during the switch in frequency.

Figure 2:
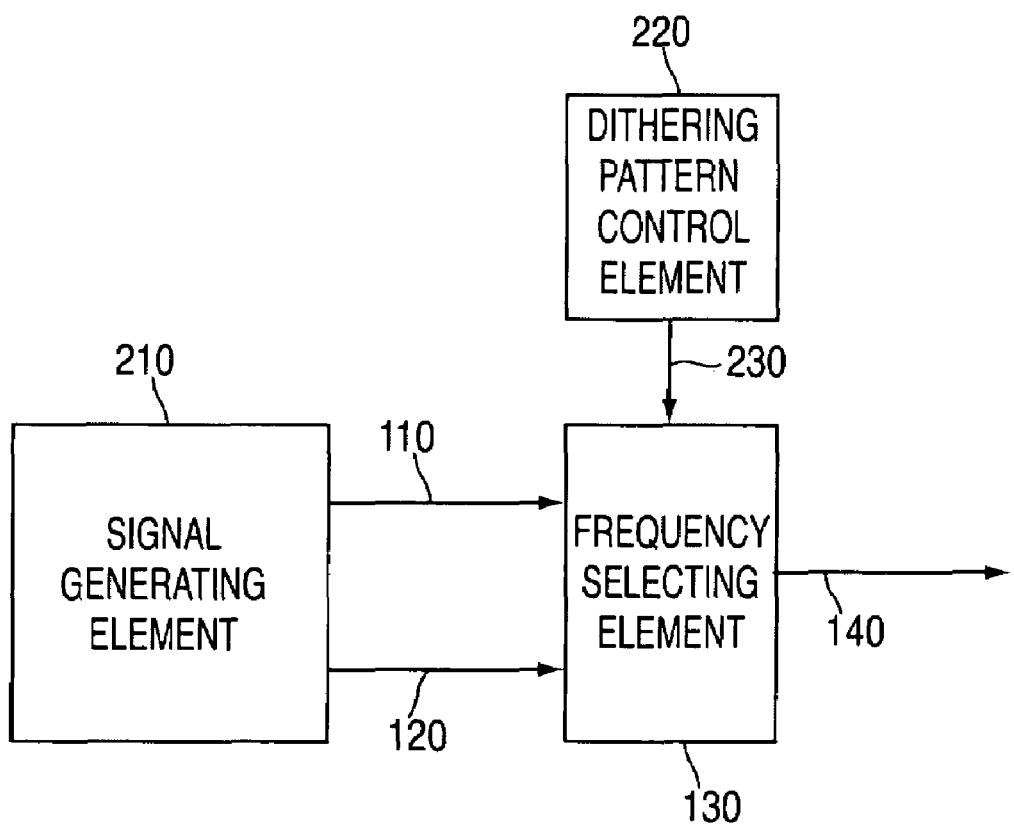
FIG. 2 shows an example of a system and a method for changing the frequency of an integrated circuit according to the present disclosure.

FIG. 2 illustrates another embodiment of the present disclosure in which first frequency signal 110 and second frequency signal 120 are provided to frequency selecting element 130 by signal generating element 210. It should be noted that signal generating element 210 can provide any number of frequency signals to frequency selecting element 130. Dithering pattern control element 220 provides to frequency selecting element 130 dithering pattern control signal 230. Dithering pattern control signal 230 instructs frequency selecting element 130 as to which of first frequency signal 110 or second frequency signal 120 to select and pass through as output frequency signal 140 during any given cycle. At the start of a change from first frequency signal 110 to second frequency signal 120, output frequency signal 140 is that of first frequency signal 110. During the change, frequency selecting element 130 dithers second frequency signal 120 into output frequency signal 140 such that over a predetermined number of clock cycles second frequency signal 120 gradually replaces first frequency signal 110 as output frequency signal 140. After the predetermined number of clock cycles, output frequency signal 140 is set to the second frequency signal 120.

Figure 3:
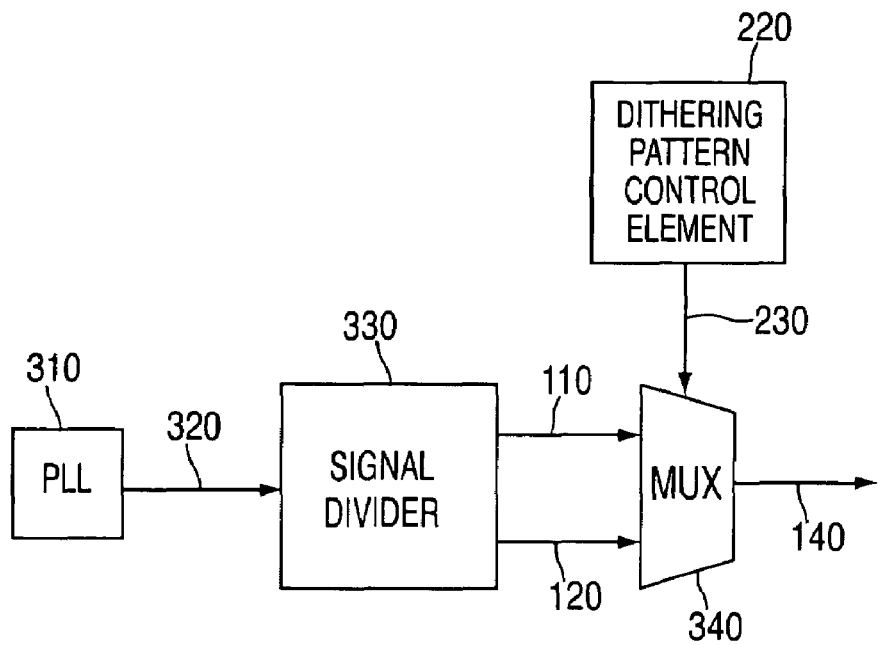
FIG. 3 shows another example of a system and a method for changing the frequency of an integrated circuit according to the present disclosure.

FIG. 3 illustrates yet another embodiment of the present disclosure in which the signal generating element 210 of FIG. 2 includes a phase locked loop (PLL) circuit element 310 which provides a clock frequency signal 320 to a signal divider 330. Signal divider 330 divides the clock frequency signal 320 into a plurality of frequency signals, here first frequency signal 110 and second frequency signal 120. One of ordinary skill in the art will recognize that a signal divider can be replaced by a signal multiplier to provide a plurality of frequency signals. In one aspect a signal multiplier can be implemented as a PLL. In FIG. 3, the frequency selecting element 130 of FIG. 2, includes a clock frequency signal multiplexer 340. First frequency signal 110 and second frequency signal 120 are provided to clock frequency signal multiplexer 340. Dithering pattern control element 220 provides to clock frequency signal multiplexer 340 dithering pattern control signal 230. Dithering pattern control signal 230 instructs clock frequency signal multiplexer 340 as to which of first frequency signal 110 or second frequency signal 120 to select and pass through as output frequency signal 140 during any given cycle. At the start of a change from first frequency signal 110 to second frequency signal 120, output frequency signal 140 is that of first frequency signal 110. During the change, multiplexer clock frequency signal 340 dithers second frequency signal 120 into output frequency signal 140 such that over a predetermined number of clock cycles second frequency signal 120 gradually replaces first frequency signal 110 as output frequency signal 140. After the predetermined number of clock cycles, output frequency signal 140 is set to the second frequency signal 120.

Figure 4:
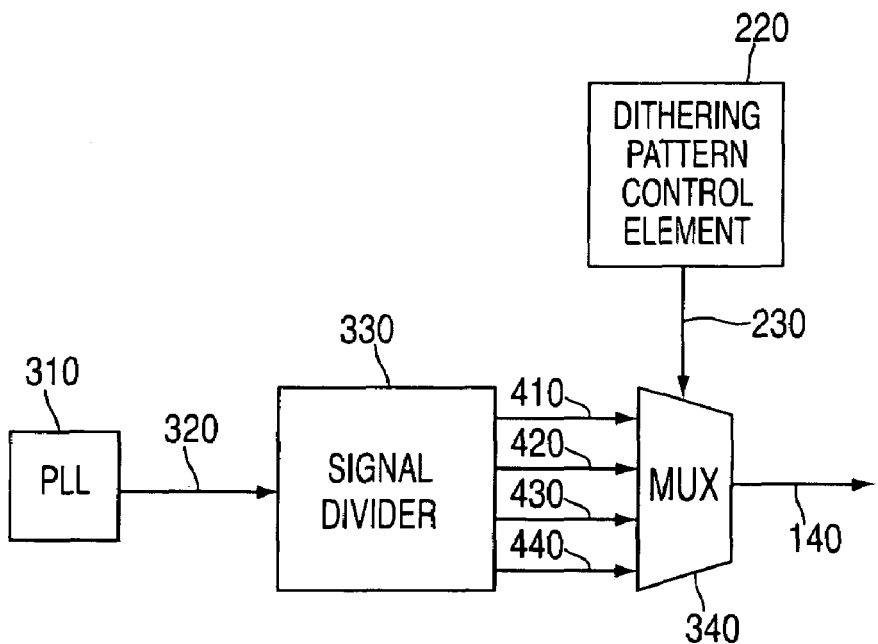
FIG. 4 shows yet another example of a system and a method for changing the frequency of an integrated circuit according to the present disclosure.

FIG. 4 illustrates still yet another embodiment of the present disclosure in which signal divider 330 divides clock signal 320 into a plurality of frequency signals, including first frequency signal 410, second frequency signal 420, third frequency signal 430 and fourth frequency signal 440. It should be noted that clock signal 320 can be divided by any integer. In one example, where clock signal 320 is f cycles/second, first frequency signal 410 can be f, second frequency signal 420 can be f/2, third frequency signal 430 can be f/4, and fourth frequency signal 440 can be f/64. One of ordinary skill in the art will recognize that the frequencies provided to the frequency selecting element, in this case clock frequency signal multiplexer 340, are not limited to these specific examples.

Referring again to FIG. 4, first frequency signal 410, second frequency signal 420, third frequency signal 430 and fourth frequency signal 440 are provided to clock frequency signal multiplexer 340. Dithering pattern control element 220 provides to clock frequency signal multiplexer 340 dithering pattern control signal 230. Dithering pattern control signal 230 instructs clock frequency signal multiplexer 340 as to which of the plurality of incoming frequency signals to select and pass through. In one example, where the desired change in frequency is from second frequency signal 420 to third frequency signal 430, clock frequency signal multiplexer 340 dithers third frequency signal 430 into output frequency signal 140 such that over a predetermined number of clock cycles third frequency signal 430 gradually replaces second frequency signal 420 as output frequency signal 140. After the predetermined number of clock cycles, output frequency signal 140 is set to the third frequency signal 430.

Figure 5:
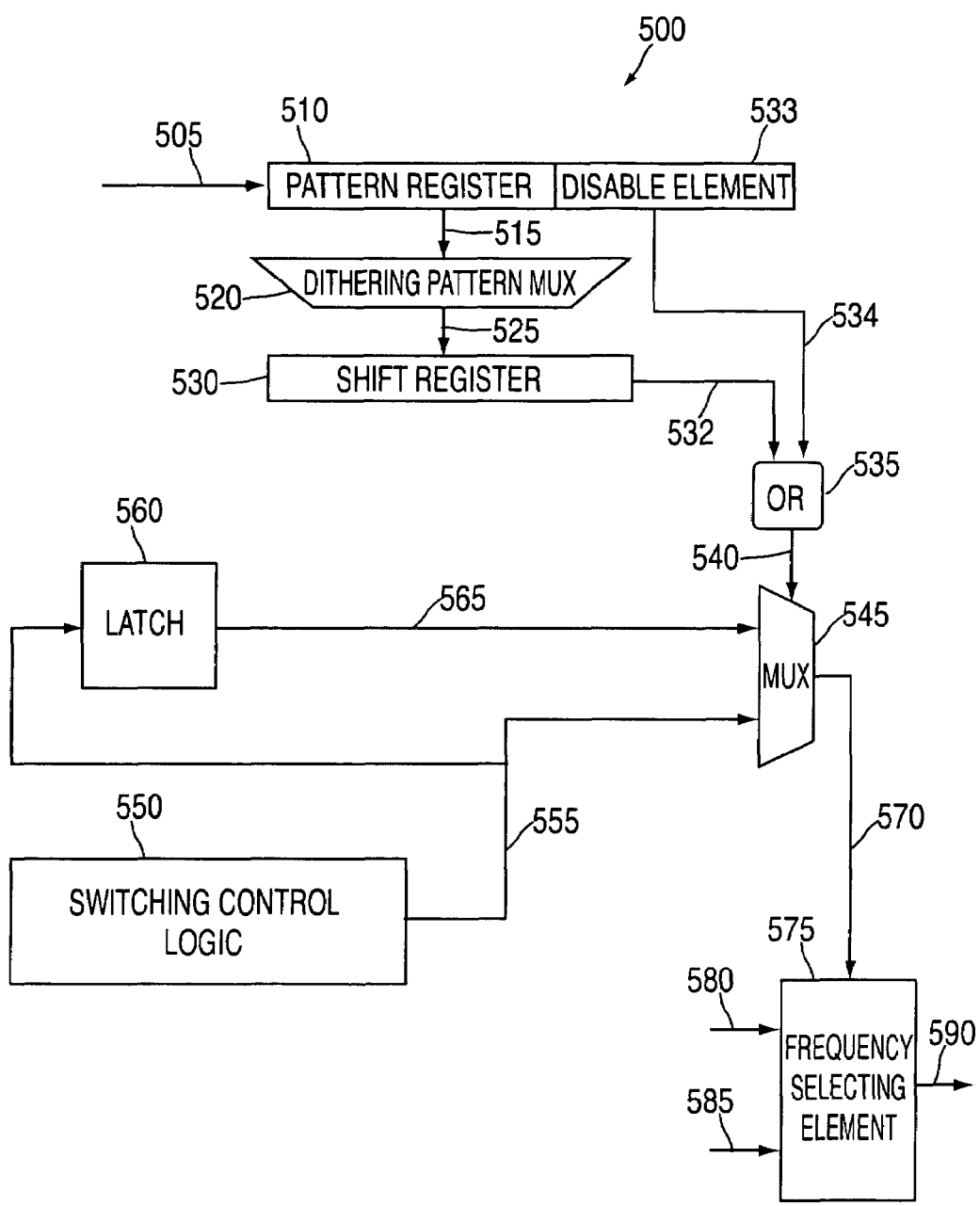
FIG. 5 shows an example of a dithering pattern control element according to the present disclosure.

FIG. 5 illustrates one example of a dithering pattern control element 500 according to the present disclosure. One or more dithering patterns 505 are loaded into first pattern register 510. Each of the one or more dithering patterns 505 controls a given transition from a first frequency signal to a second frequency signal as described above. The values of the first and second frequency signals and whether the change between them is a decrease or an increase in frequency will dictate the actual dithering pattern. First pattern register 510 provides the plurality of dithering pattern signals 515 stored in the first pattern register 510 to first dithering pattern multiplexer 520. First dithering pattern multiplexer 520 selects and passes through a dithering pattern 525 corresponding to the desired frequency signal transition. Dithering pattern 525 is provided to shift register 530. One of ordinary skill in the art would recognize that if only one dithering pattern is required to be stored in first pattern register 510, first dithering pattern multiplexer 520 and shift register 523 would not be required. Shift register 530 controls second dithering pattern multiplexer 545. Shift register 530 is clocked by the f/2 clock. Shift register 530 provides a dithering pattern signal 532 to logical "or" element 535. Disable element 533 provides disable dither signal 534 to logical "or" element 535. Logical "or" element 535 is operatively configured to pass through the dithering pattern signal 532 as dithering pattern multiplexer control signal 540 to second dithering pattern multiplexer 545 when dithering is desired. When dithering of the clock frequency signal is to be stopped, the logical "or" element 535 passes through the disable dither signal Y as dithering pattern multiplexer control signal 540 to second dithering pattern multiplexer 545. Switching control logic 550 provides new clock frequency value signal 555 to second dithering pattern multiplexer 545. New clock frequency value signal 555 is also provided to latch 560. Latch 560 has stored previous clock frequency value signal 565 which is provided to second dithering pattern multiplexer 545. Latch 560 is operatively configured to store and provide the previous clock frequency value signal until the new clock frequency value signal changes at which point it will store and provide what was the new clock frequency value signal as the previous clock frequency value for the next clock frequency shift. Second dithering pattern multiplexer 545 selects between new clock frequency value signal 555 or previous clock frequency value signal 565 as instructed by dithering pattern multiplexer control signal 540, and passes on the chosen signal as dithering pattern control signal 570 to frequency selecting element 575. Frequency selecting element 575 selects between first frequency signal 580 and second frequency signal 585 as instructed by dithering pattern control signal 570. In one example where the desired clock frequency change is from first frequency signal 580 to second frequency signal 585, the frequency selecting element 575 will select first frequency signal 580 when dithering pattern control signal 570 is the previous clock frequency value signal and will select second frequency signal 585 when dithering pattern control signal 570 is the new clock frequency value signal.

It should be noted that one of ordinary skill in the art could devise alternate dithering pattern control elements that deliver instructions to a frequency selecting element, such as a multiplexer, to select from amongst a plurality of incoming frequency signals such that an output frequency signal is alternated between a first frequency signal and a second frequency signal for a predetermined number of clock cycles, and setting the output frequency signal to the second frequency signal after the predetermined number of clock cycles.

Although the invention has been described and illustrated with respect to exemplary embodiments thereof, it should be understood by those skilled in the art that the foregoing and various other changes, omissions and additions may be made therein and thereto, without parting from the spirit and scope of the present invention.

The invention claimed is:

1. A method of shifting a clock frequency of an integrated circuit device from a first frequency to a second frequency, the method comprising:
   a. alternating between the first frequency and the second frequency according to a dithering pattern, said alternating occurring for a predetermined number of cycles; and
   b. setting the clock frequency to said second frequency after said predetermined number of cycles.

2. A method according to claim 1, wherein said dithering pattern gradually replaces the first frequency with the second frequency.

3. A method according to claim 1, wherein said dithering pattern is programmable.

4. A method according to claim 1, wherein the first frequency is a frequency of f cycles per second and the second frequency is a frequency of f/n cycles per second, wherein n is an integer.

5. A method according to claim 1, wherein the first frequency is a frequency of f cycles per second and the first frequency is a frequency of f/n cycles per second, wherein n is an integer.

6. A method according to claim 1, wherein the first frequency is the same as a master clock frequency and the second frequency is said master clock frequency divided by n, wherein n is an integer.

7. A method according to claim 1, wherein said alternating step includes:
   a. providing a clock multiplexer operatively configured to select between a plurality of incoming clock frequencies, wherein the first and second frequencies are included in said plurality of incoming clock frequencies;
   b. providing a dithering pattern to said clock multiplexer; and
   c. selecting the first frequency or the second frequency according to said dithering pattern.

8. A method according to claim 1, wherein said alternating step occurs at a rate of the slower of the first frequency and the second frequency.

9. A method of shifting a clock frequency of an integrated circuit device from a first frequency to a second frequency, the method comprising:
   a. providing a clock multiplexer operatively configured to select between a plurality of incoming frequencies, wherein the first frequency and second frequency are amongst said plurality of incoming clock frequencies;

b. providing a dithering pattern to said clock multiplexer;

c. alternating the clock frequency of the integrated circuit between the first frequency and the second frequency according to said dithering pattern for a predetermined number of clock cycles; and d. setting the clock frequency of the integrated circuit at the second frequency after said predetermined number of clock cycles.

10. A method according to claim 9, wherein said alternating step occurs at a rate of the slower of the first frequency and the second frequency.

11. A method according to claim 9, wherein the first frequency is a frequency of f cycles per second and the second frequency is a frequency of f/n cycles per second, wherein n is an integer.

12. A method according to claim 9, wherein said second frequency is a frequency of f cycles per second and said first frequency is a frequency of f/n cycles per second, wherein n is an integer.

13. A method according to claim 9, wherein said alternating step gradually replaces said first frequency with said second frequency as the clock frequency of the integrated circuit.

14. A system for shifting a clock frequency of an integrated circuit device from a first frequency to a second frequency, the system comprising:

a. a frequency selecting element operatively configured to switch between a first frequency input signal and a second input frequency signal, wherein said frequency selecting element provides an output frequency signal;

b. a dithering pattern control element operatively configured to produce a dithering pattern, said dithering pattern controlling said frequency selecting element so as to cause said frequency selecting element to alternate between said first and second input frequency signals for a predetermined number of cycles, wherein said output frequency signal is set at said second frequency signal after said predetermined number of cycles.

15. A system according to claim 14, wherein said dithering pattern control element comprises:

a. a dithering multiplexer; and b. a latch operatively configured to store one or more dithering patterns, said dithering patterns provided to said dithering multiplexer, wherein said dithering multiplexer is operatively configured to select between a first frequency value and a second frequency value.

16. A system according to claim 14, wherein said dithering pattern is operatively configured to gradually replace said first input frequency signal with said second input frequency signal.

17. An integrated circuit comprising the system of claim 14.

18. An electronic device comprising the system of claim 14.

19. A system according to claim 14, wherein said frequency selecting element is a multiplexer or an analog mixer.

20. A system according to claim 15, wherein said dithering multiplexer selects at a cycle rate of the slower of said first input frequency signal and said second input frequency signal.

* * * * *